United States Patent
Kim et al.

(10) Patent No.: US 7,930,510 B2
(45) Date of Patent: Apr. 19, 2011

(54) DYNAMIC STACK ALLOCATING METHOD IN MULTI-THREADED OPERATING SYSTEMS

(75) Inventors: Sang Cheol Kim, Gyeongsani-si (KR); Hae Yong Kim, Daejeon (KR); Chang Min Shin, Daejeon (KR); Jin Won Kim, Pyeongtaek-si (KR); Mi Sun Yu, Daejeon (KR); Jin Ho Chang, Daejeon (KR); Pyeong Soo Mah, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 555 days.

(21) Appl. No.: 12/031,248

(22) Filed: Feb. 14, 2008

(65) Prior Publication Data

US 2008/0276063 A1    Nov. 6, 2008

(30) Foreign Application Priority Data

May 2, 2007    (KR) .................. 10-2007-0042626

(51) Int. Cl.
*G06F 12/00*    (2006.01)
(52) U.S. Cl. ........................ 711/171; 711/172
(58) Field of Classification Search .................. None
See application file for complete search history.

(56) References Cited

U.S. PATENT DOCUMENTS

| | | | |
|---|---|---|---|
| 5,950,221 A * | 9/1999 | Draves et al. | 711/100 |
| 6,381,738 B1 * | 4/2002 | Choi et al. | 717/140 |
| 6,993,754 B2 * | 1/2006 | Freudenberger et al. | 717/153 |
| 7,356,812 B2 * | 4/2008 | Herschleb | 717/159 |
| 2004/0143833 A1 | 7/2004 | Heyrman et al. | |

FOREIGN PATENT DOCUMENTS

| | | |
|---|---|---|
| KR | 1999-0050564 | 7/1999 |
| KR | 1020010038482 | 5/2001 |
| KR | 20010062966 | 7/2001 |

OTHER PUBLICATIONS

Sang Cheol Kim et al.; "A Dynamic Stack Allocating Method in Multi-Threaded Operating Systems for Wireless Sensor Network Platforms"; The International Symposium on Consumer Electronics (ISCE 2007 ); Jun. 2003, 2007; pp. 1-6.
Christian Tismer; "Continuations and Stackless Python or How to change a Paradigm of an existing Program"; Proceeding of the 8th International Python Conference; Aug. 2000; pp. 1-13.

(Continued)

*Primary Examiner* — Than Nguyen
(74) *Attorney, Agent, or Firm* — Lowe Hauptman Ham & Berner LLP

(57) ABSTRACT

Provided is a method of dynamically reallocating a thread stack in a multi-threaded operating system, and more particularly, a method of dynamically allocating a thread stack of a multi-threaded operating system in an embedded system for wireless sensor nodes. The method includes the steps of: measuring sizes of data and non-data sections of a stack with respect to each thread; determining a new size of the non-data section of each stack based on the size of the data section of the stack measured with respect to each thread; and adjusting the size of the non-data section of each stack to the determined new size. According to the method, even without the source code analysis, an amount of memory spaces to be used can be reduced compared to that of a conventional static stack allocation method.

13 Claims, 4 Drawing Sheets

OTHER PUBLICATIONS

Adam Torgerson; "Automatic Thread Stack Management for Resource-Constrained Sensor Operating Systems"; B.S. Thesis of University of Colorado; Feb. 2005; pp. 1-19.

Korean office Action dated Oct. 29, 2008, for Korean application No. 10-2007-0042626.

"An Efficient Memory Allocation Scheme for Space Constrained Sensor Operating Systems," Sangho Yi et al., journal of Korea Information Science Society, vol. 33, No. 9, pp. 626-633, Sep. 2006.

"Cache Miss Aware Dynamic Stack Allocation," Sung-Joon Jang, a master's thesis in Korea Advanced Institute of Science and Technology, Feb. 2007.

* cited by examiner

FIG. 5

Algorithm StackReallocation($S, [\bar{y}_1, ..., \bar{y}_n]$)
    while ($|S| > 1$)
    {
        $S_i$ : the bottom element of $S$;
        PushPull($x_{i+1}, \Delta y_i$); /* consider the overlap */
        $S = S - \{S_i\}$;
    }
    $y_n = y_n + \Delta y_n$;

Function PushPull($x_{i+1}, \Delta y_i$)}
/* overlap testing */
overlap = $\Delta y_i > y_{i+1}$ and $s_{i+1} \neq s_n$;
if (overlap)
{
    PushPull($x_{i+2}, \Delta y_i + \Delta y_{i+1}$); /* Recursion */
    Push($x_{i+1}, \Delta y_i$);
    $S = S - \{s_{i+1}\}$;
}
else /* no overlap */
{
    if ($\Delta y_i > 0$) Push($x_{i+1}, \Delta y_i$);
    if ($\Delta y_i < 0$) Pull($x_{i+1}, -\Delta y_i$);
}

DYNAMIC STACK ALLOCATING METHOD IN MULTI-THREADED OPERATING SYSTEMS

CROSS-REFERENCE TO RELATED APPLICATION

This application claims priority to and the benefit of Korean Patent Application No. 2007-42626, filed May 2, 2007, the disclosure of which is incorporated herein by reference in its entirety.

BACKGROUND

1. Field of the Invention

The present invention relates to a method of dynamically allocating a thread stack in a multi-threaded operating system, and more particularly, to a method of dynamically allocating a thread stack in a multi-threaded operating system of an embedded system for wireless sensor nodes.

The present invention has been produced from the work supported by the IT R&D program of MIC (Ministry of Information and Communication)/IITA (Institute for Information Technology Advancement) [2006-S-085-01, Nano OS for Automobile Sensor Nodes]

2. Discussion of Related Art

A wireless sensor networks include hundreds or thousands of wireless sensor nodes. These wireless sensor nodes collect information and process the information to communicate with neighboring nodes. Generally, a wireless sensor node includes with a small amount of memory (such as 2 KB to 10 KB), without a memory hardware protection device, i.e., a Memory Management Unit (MMU), because of low power and low cost. However, to perform multiple tasks in parallel in the memory-restricted embedded system, a multi-threaded operating system is needed.

In general, in the multi-threaded operating system, thread stacks are statically allocated in a memory space. In a static allocating method, a stack space to be used by the corresponding thread when a thread is generated is statically allocated and is not changed when a program is executed. Therefore, when the stack space allocated to the thread is partially used, this causes waste of memory in the remaining space. Also, in this method, a thread that requires more stack memory cannot use the memory, and thus a problem such as a stack overflow frequently occurs.

In view of this drawback, while a method of allocating a thread stack based on source code analysis has been suggested, the source code analysis is very complicated and takes too much time.

SUMMARY OF THE INVENTION

The present invention is directed to a method of dynamically allocating a thread stack, which enables efficient use of a memory space in a multi-threaded operating system of a sensor node having a restricted memory space.

The present invention is also directed to a method of dynamically allocating a thread stack based on stack usage information, which is measured during the execution of a program in a multi-thread operating system of a sensor node.

One aspect of the present invention provides a method of dynamically allocating a thread stack in a multi-threaded operating system comprising the steps of: measuring sizes of data and non-data sections of a stack with respect to each thread; determining a new size of the non-data section of each stack based on the size of the data section of the stack measured with respect to each thread; and adjusting the size of the non-data section of each stack to the determined new size.

When there is a difference between the current size of a non-data section and the new size of the non-data section of a lower stack, the step of adjusting the size of the non-data section of each stack may comprise the step of transferring a data section of a higher stack adjacent to the lower stack to a higher memory region or a lower memory region by the difference.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 5 illustrates a stack allocation algorithm according to an exemplary embodiment of the present invention.

DETAILED DESCRIPTION OF EMBODIMENTS

The present invention will now be described more fully hereinafter with reference to the accompanying drawings, in which exemplary embodiments of the invention are shown.

Figure 1:
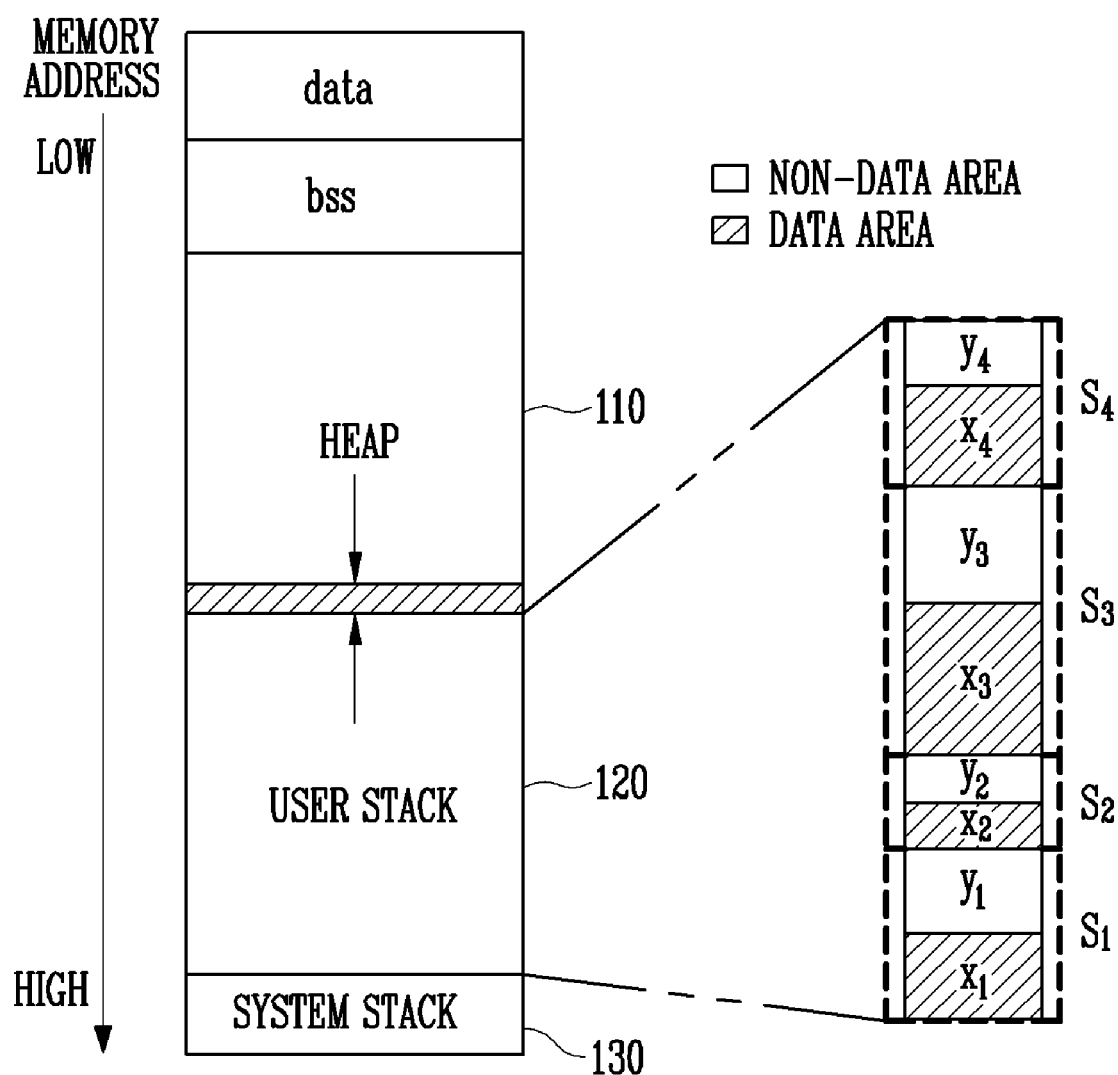
FIG. 1 illustrates the configuration of a general memory map in a multi-threaded operating system.

FIG. 1 illustrates a general memory map of a multi-threaded operating system. As illustrated, a heap section 110 and stack sections 120 and 130 may share a memory space, so that the larger the heap section 110 becomes, the smaller the stack sections 120 and 130 become, and vice versa. The stack section is largely divided into a system stack section 130 and a user stack section 120, and the user stack section 120 is divided to be allocated to each of multi-threads. Each of the multi-threads $S_1$, $S_2$, $S_3$ and $S_4$ is divided into a data section and a non-data section. Data sections $x_1$, $x_2$, $x_3$, and $x_4$ are memory regions where stack data has ever been contained in the entire stack space, and non-data sections $y_1$, $y_2$, $y_3$, and $y_4$ are sections that do not include the stack data yet.

The non-data section may be an section excluding the data section from the entire stack section. The size of the non-data section should be determined by taking into account the size of the data section. When the size of the non-data section is extremely large, considerable waste of a stack memory occurs, and when it is extremely small, a stack overflow may occur. Generally, the appropriate size of the non-data section may be about 10% to 20% of the size of the data section.

Figure 2:
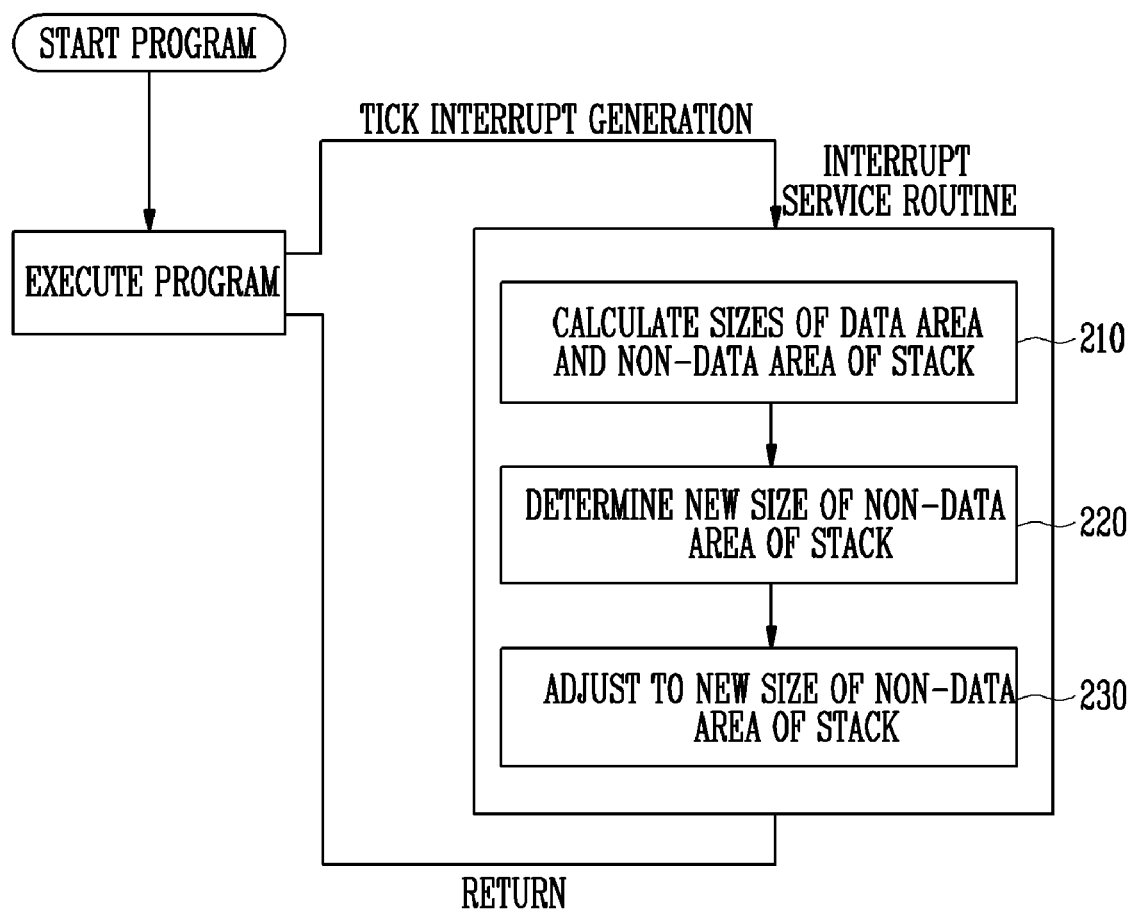
FIG. 2 illustrates a process of performing a method of dynamically allocating a thread stack according to an exemplary embodiment of the present invention.

FIG. 2 illustrates a process of performing a method of dynamically reallocating a thread stack according to an exemplary embodiment of the present invention. As illustrated in FIG. 2, during execution of a program, a tick interrupt occurs periodically. The tick interrupt is a timer interrupt that occurs at periodic intervals. Whenever the tick interrupt occurs periodically, an interrupt service routine performs reallocation of a thread stack.

To be specific, in step 210, the sizes of the data and non-data sections of each thread stack are calculated. After the size of the data section is measured, the size of the data section may be deducted from the entire stack size to calculate the size of the non-data section.

In the next step 220, the size of the data section of each thread stack is taken into account to determine the new size of the non-data section. Since the data section is an section in which data is actually stored, the data section cannot be adjusted. Therefore, the size of the entire stack may be controlled by adjusting the size of the non-data section only.

When the size of the non-data section is extremely small, it should be larger, and when it is extremely large, it should be smaller. The optimal size of the non-data section varies depending on an application, and thus it is not easily determined. According to an exemplary embodiment of the present invention, the optimal size of the non-data section may be determined by taking into account the following:

(1) A new size of a non-data section should be determined with reference to the current size of a data section. When the current size of the data section is large, it is necessary to enlarge the non-data section. (For example, in the exemplary embodiment, the size of the non-data section may be determined to be about 10% to 20% of the size of the data section);

(2) The new size of the non-data section should be equal to or greater than a predetermined threshold value. Generally, when a certain function is called, data corresponding to the number of specific bytes is stored in a stack, for example, current register values should be stored in the stack; and (3) When the current size of the non-data section is extremely small, it is necessary to enlarge it, and when it is extremely large, it is necessary to reduce it. However, the occurrence of stack overflow should be considered while the size is reduced.

Finally, in step 230, the size of the non-data section of each thread stack should be re-adjusted as determined in step 220. The adjustment of the size of the non-data section is sequentially performed from a lower stack to a higher stack, and is performed by transferring a data section of a stack to a higher memory region or to a lower memory region. At this time, the stack data should not be damaged, and the occurrence of overhead should be minimized.

Figure 3:
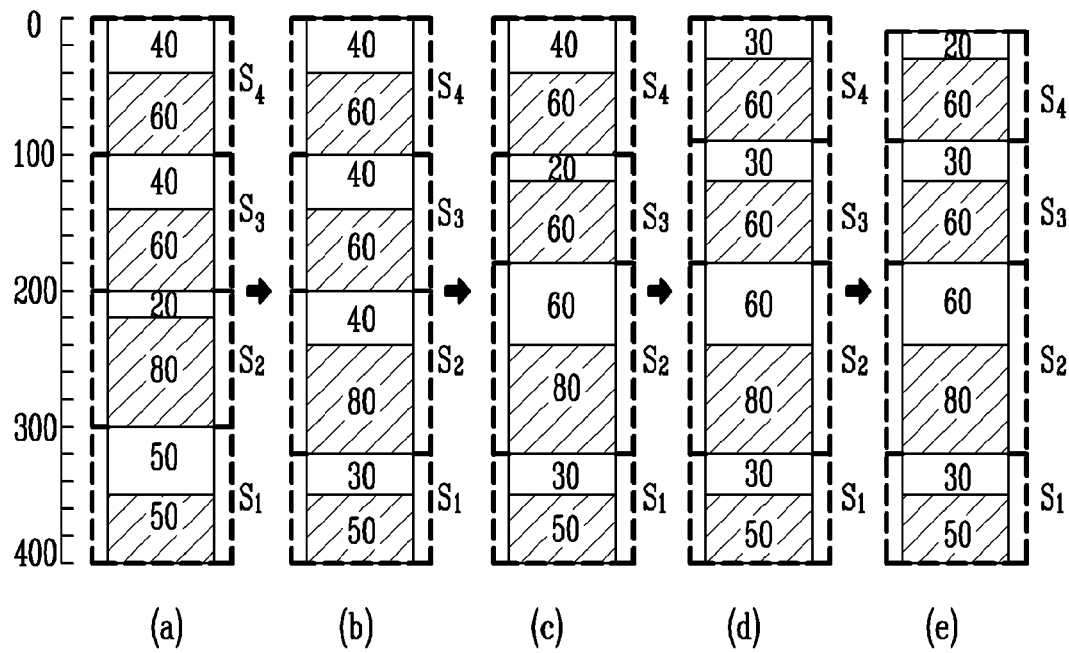
FIG. 3 illustrates an example of a process of stack allocation according to an exemplary embodiment of the present invention.

FIG. 3 illustrates an example of a process of reallocating a stack according to an exemplary embodiment of the present invention. In this example, it is assumed that there are four threads, each of which has a thread stack having a size of 100 bytes. When thesizes of the data section and non-data section of each thread stack are represented by $(x_i, y_i)(1<=i<=$the number of threads), the sizes of the data section and non-data section of the four thread stacks may be represented as (50, 50), (80, 20), (60, 40), and (60, 40) as illustrated in (a) of FIG. 3. Also, it is assumed that the new size ($\overline{y_1}, \overline{y_2}, \overline{y_3},$ and $\overline{y_4}$) of non-data sections of each thread stack is determined as (30, 60, 30 and 20) in the process of determining the new stack size. A process of changing to the non-data section having the new size of the thread stack will be described as follows:

(1) The stack is extended toward lower addresses. Therefore, size $x_1$ of a data section of Stack 1 is not affected by the control of size $y_1$ of a non-data section of Stack 1, and thus does not need to be changed;

(2) As illustrated in (b) of FIG. 3, to make size $y_1$ of the non-data section of Stack 1 to 30 bytes, size $x_2$ of the data section of Stack 2 is decreased by 20 bytes (during this process, size $y_2$ of the non-data section of Stack 2 becomes 40 bytes);

(3) As illustrated in (c) of FIG. 3, to make size $y_2$ of the non-data section of Stack 2 to 60 bytes, size $x_3$ of the data section of Stack 3 is increased by 20 bytes (during this process, size $y_3$ of the non-data section of Stack 3 becomes 20 bytes);

(4) As illustrated in (d) of FIG. 3, to make size $y_3$ of the non-data section of stack 3 to 30 bytes, size $x_4$ of the data section of Stack 4 is increased by 10 bytes (during this process, size $y_4$ of the non-data section of Stack 4 becomes 30 bytes); and (5) As illustrated in (e) of FIG. 3, size $y_4$ of the non-data section of Stack 4 is adjusted to 20 bytes.

When transferring size $x_2$ of the data section of Stack 2 to a lower section in the above-mentioned process (2), it may be shown that the data section of Stack 1 having size $x_1$ pulls the data section of Stack 2 having size $x_2$. Similarly, in the processes (3) and (4), it may be shown that the data section having size $x_1$ pushes the data section having size $x_{i+1}$.

In conclusion, defining $\Delta y_i = \overline{y_i} - y_i$, when $\Delta y_i = 0$, it is unnecessary to transfer size $x_{+1}$. When $\Delta y_i > 0$, the data section having size $x_i$ pushes the data section having size $x_{i+1}$ by $\Delta y_i$ (represented by Push($x_{i+1}, \Delta y_i$)). Similarly, when $\Delta y_i < 0$, it is shown that the data section having size $x_i$ pulls the data section having size $x_{i+1}$ by $\Delta y_i$ (represented by Pull($x_{i+1}, -\Delta y_i$)).

While overlap with a neighboring data section does not occur in the process of transferring the data section in FIG. 3, it may occur in some cases.

Figure 4:
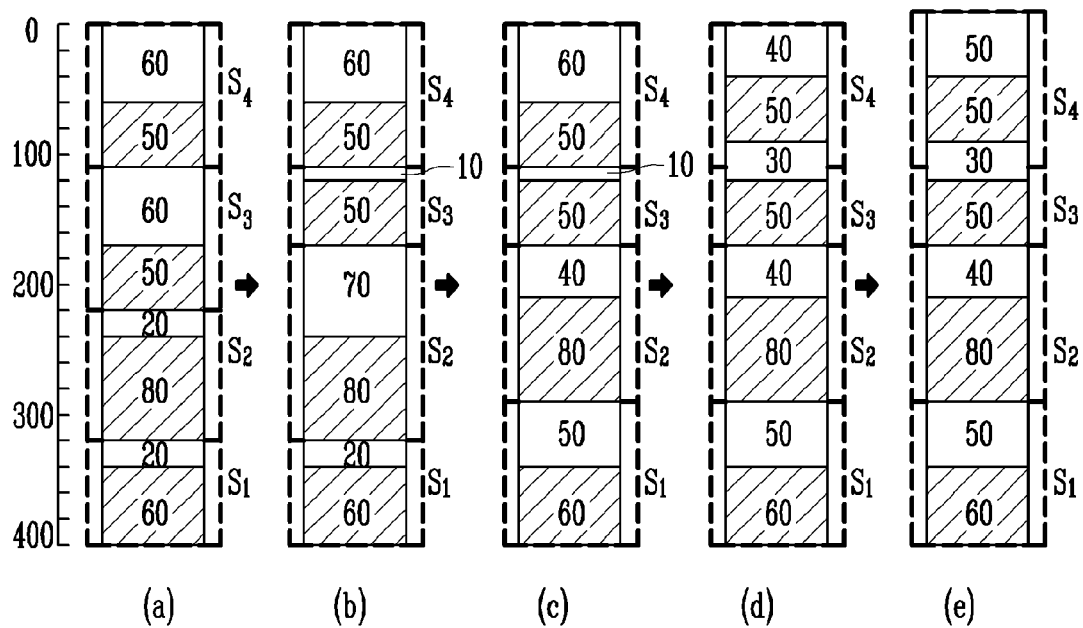
FIG. 4 illustrates another example of a process of stack allocation according to an exemplary embodiment of the present invention.

FIG. 4 illustrates a case when overlap with a data section occurs in the process of reallocating a stack. As illustrated in (a) of FIG. 4, it is assumed that $(x_1,y_1)=(60,20)$, $(x_2,y_2)=(80, 20)$, $(x_3,y_3)=(50,60)$ and $(x_4,y_4)=(50,60)$ and the sizes ($\overline{y_1}, \overline{y_2}, \overline{y_3}$ and $\overline{y_4}$) of non-data sections of stacks are determined as (50, 40, 30 and 50) in the process of determining the new size of a stack. Here, since $\Delta y_1$ is 30 bytes, Push($x_2$, 30) is needed for $y_1$ to be 50 bytes. However, when the data section having size $x_2$ is transferred to a higher memory region by 30 bytes, a data section having size $x_3$ is damaged by 10 bytes so that an overlap problem occurs. Therefore, to prevent the overlap problem, the data section having size $s_3$ should be transferred to a higher region first, and then the data section having size $x_2$ should be transferred upward. When the same is applied to $x_3$ and $x_4$, the push operation should be recursively performed.

A process of allocating a stack in consideration of the overlap problem will be described below with reference to FIG. 4.

(1) Before performing Push($x_2$, 30), to make size $y_1$ of a non-data section of a lower stack to 50 bytes, the data section having size $x_2$ pushes the data section having size $x_3$ by 50($\Delta y_1 + \Delta y_2$) bytes. When the push operation is performed, $y_2$ becomes 70 bytes as illustrated in (b) of FIG. 4.

(2) Now, Push($x_3$, 30) is performed. Even if the data section having size $x_1$ pushes the data section having size $x_2$ by 30 bytes, the overlap problem does not occur between $x_2$ and $x_3$. After Push($x_3$, 30) is performed, $y_1$ becomes 50 bytes, and $y_2$ becomes 40 bytes, as illustrated in (c) of FIG. 4.

(3) Although Push($x_4$, 20) is performed to make $y_3$ to 30 bytes, the overlap problem does not occur (refer to (d) of FIG. 4).

(4) $y_4$ is adjusted to 50 bytes (refer to (e) of FIG. 4).

As described above, when the allocation of a stack is performed, whether or not the overlap problem occurs should be taken into account before performing the push operation on a data section. The stack allocation, in which the overlap problem is taken into account, will be described below in more detail with reference to FIG. 5.

FIG. 5 illustrates a stack allocation algorithm according to an exemplary embodiment of the present invention. As illustrated, it is observed that when the overlap problem occurs, a function PushPull($x_{i+1}, \Delta y_i$) is repeatedly performed. A function PushPull($x_{i+1}, \Delta y_i$) serves to perform the combination of pull and push operations with respect to $x_i$ in consideration of the overlap problem. To be specific, PushPull($x_{i+1}, \Delta y_i$) may be represented as follows.

$$PushPull(X_{i+1}, \Delta y_i) = \begin{cases} Pull(X_{i+1}, -\Delta y_i), & \text{if } \Delta y_i < 0 \\ Push(X_{i+1}, \Delta y_i), & \text{if } \Delta y_i > 0, \Delta y_i \leq y_i + 1 \\ Push\left(X_{k+1}, \sum_{r=i}^{k} \Delta y_i\right), \\ Push(X_{i+1}, \Delta y_i), & \text{if } \Delta y_i > 0, \Delta y_i > y_i + 1 \\ do\ nothing, & \text{if } \Delta y_i = 0 \end{cases}$$

That is, (1) When a difference $\Delta y_i$ between the current size of a data section of the $i^{th}$ stack and the new size of a non-data section is less than 0, a data section of the $i^{th}$ stack having size $x_i$ pulls a data section of the $i+1^{th}$ stack having size ($x_{i+1}$) by $\Delta y_i$ (i.e., $x_{i+1}$ is transferred to a lower memory section by $\Delta y_i$).

(2) When the difference $\Delta y_i$ between the current size of the data section of the corresponding stack and the new size of the non-data section exceeds 0, but is equal to or less than $y_{i+1}$, it is determined that the overlap problem does not occur, and thus the data section having size $x_i$ pushes the data section having size $x_{i+1}$ by $\Delta y_i$ (i.e., $x_{i+1}$ is transferred to a higher memory region by $\Delta y_i$).

(3) However, when the difference $\Delta y_i$ between the current size of the data section of the corresponding stack and the new size of the non-data section exceeds both 0 and $y_{i+1}$, it is determined that the overlap problem occurs when the data section having size $x_{i+1}$ is pushed by $\Delta y_i$. Therefore, to prevent the overlap problem, a series of push operations with respect to one or more data sections of higher stacks should be performed. When it is assumed that the overlap problem does not occur in size ($x_k, k >= i+2$) of a data section of the $k^{th}$ stack, data sections of size $x_i$ to size $x_k$ allow the transfer without the overlap problem. When it is assumed that the data section having size $x_k$ pushes the data section having size $x_{k+1}$, a memory space to be pushed is $$\sum_{r=i}^{k} \Delta y_i.$$

$$Push\left(x_{k+1}, \sum_{r=i}^{k} \Delta y_i\right), \ldots, Push(x_{i+1}, \Delta y_i)$$

Therefore, is performed.

The present invention may be provided as one or more computer-readable recording media implemented on one or more products. The products may be a floppy disk, a hard disk, a CD ROM, a flash memory card, a PROM, a RAM, a ROM or a magnetic tape. Generally, a computer-readable program may be implemented using an arbitrary programming language. Examples of available languages include C, C++ and JAVA.

As described above, the amount of use of each thread stack is measured in the process of executing a program, and a stack section is dynamically reallocated depending on the amount of use of a stack in the present invention. As a result, a stack space is more efficiently used in the present invention than in a conventional method of statically reallocating a thread stack.

Further, since this method does not require such a complicated process including source code analysis, it can be implemented in a simple manner to accomplish a desired purpose.

In the drawings and specification, typical preferred embodiments of the invention have been disclosed and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A method of dynamically allocating a thread stack of multi-threads in a multi-threaded operating system used in wireless sensor node without a Memory Management Unit, the method comprising the steps of:
    measuring sizes of data and non-data sections of the thread stack with respect to each of the multi-threads;
    determining a new size of the non-data section of the thread stack based on the size of the data section of the thread stack measured with respect to each of the multi-threads; and
    adjusting the size of the non-data section of the thread stack to the new size.

2. The method of claim 1, wherein the method is performed at a sensor node.

3. The method of claim 1, wherein the method is performed whenever a tick interrupt occurs.

4. The method of claim 1, wherein the new size of the non-data section of the thread stack is determined to be equal to or greater than a predetermined threshold value.

5. The method of claim 1, wherein the new size of the non-data section is determined to be 10% to 20% of the size of the data section.

6. The method of claim 1, wherein the step of adjusting the size of the non-data section of the thread stack is sequentially performed from a lower stack to a higher stack.

7. The method of claim 6, wherein when there is a difference between the new size of a non-data section of a lower stack and the current size of a non-date section, the step of adjusting the size of the non-data section of the thread stack comprises the step of transferring a data section of a higher stack, the higher stack being adjacent to the lower stack, to a higher memory region or a lower memory region by the difference.

8. The method of claim 7, wherein when the difference is less than 0, the data section of the adjacent higher stack is transferred to a lower memory region by the difference.

9. The method of claim 7, wherein when the difference exceeds 0, the data section of the adjacent higher stack is transferred to a higher memory region by the difference.

10. The method of claim 9, wherein the step of adjusting the size of the non-data section of the thread stack further comprises the steps of:
    determining whether or not an overlap occurs between stacks adjacent to each other before transferring the data section of the adjacent higher stack to a higher memory region; and
    transferring one or more data sections of higher stacks to a higher memory region when it is determined that the overlap occurs.

11. The method of claim 10, wherein when the difference exceeds the size of the non-data section of the higher stack adjacent to the lower stack, it is determined that the overlap occurs.

12. The method of claim 1, wherein the multi-threaded operating system includes a user stack and a system stack, and the user stack is divided to be allocated to each of the multi-threads.

13. A computer-readable recording medium, in which a computer program for performing a method of claim 1 is recorded.

* * * * *